(12) United States Patent
Chae et al.

(10) Patent No.: US 11,265,872 B2
(45) Date of Patent: Mar. 1, 2022

(54) METHOD AND APPARATUS FOR TRANSMITTING SIDELINK SIGNAL IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR); Hanbyul Seo, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 16/496,639

(22) PCT Filed: Mar. 26, 2018

(86) PCT No.: PCT/KR2018/003542
§ 371 (c)(1),
(2) Date: Sep. 23, 2019

(87) PCT Pub. No.: WO2018/174684
PCT Pub. Date: Sep. 27, 2018

(65) Prior Publication Data
US 2020/0383094 A1 Dec. 3, 2020

Related U.S. Application Data

(60) Provisional application No. 62/630,299, filed on Feb. 14, 2018, provisional application No. 62/475,869, (Continued)

(51) Int. Cl.
*H04W 72/04* (2009.01)
*H04W 4/40* (2018.01)
(Continued)

(52) U.S. Cl.
CPC ............. *H04W 72/044* (2013.01); *H04L 1/08* (2013.01); *H04L 41/0806* (2013.01); *H04L 43/16* (2013.01); *H04W 4/40* (2018.02)

(58) Field of Classification Search
None
See application file for complete search history.

(56) References Cited

U.S. PATENT DOCUMENTS 9,440,605 B2 * 9/2016 Vadgama ........... G06Q 30/0645
10,327,119 B2 * 6/2019 Park .......................... H02J 7/02
(Continued)

FOREIGN PATENT DOCUMENTS

WO 2016/163816 A1 10/2016
WO 2017/034324 A1 3/2017

OTHER PUBLICATIONS

International Search Report from PCT/KR2018/003542, dated Jul. 12, 2018.
(Continued)

*Primary Examiner* — James P Duffy
(74) *Attorney, Agent, or Firm* — Dentons US LLP

(57) ABSTRACT

The present invention relates to a wireless communication system and, specifically, to a method and an apparatus therefor, the method comprising: a step of configuring a plurality of carriers to which an SL communication is applied, wherein an SL resource pool is periodically configured in each carrier; a step of selecting one of the plurality of carriers as a serving carrier; a step of selecting a transmission resource among the SL resource pool in the selected carrier; and a step of transmitting the SL signal using the transmission resource, wherein a frequency of a process of reselecting the serving carrier is less than a frequency of a process of reselecting the transmission resource among the SL resource pool in the preselected carrier.

7 Claims, 13 Drawing Sheets

Related U.S. Application Data filed on Mar. 24, 2017, provisional application No. 62/475,868, filed on Mar. 24, 2017.

(51) Int. Cl.
  *H04L 1/08*     (2006.01)
  *H04L 41/0806*  (2022.01)
  *H04L 43/16*    (2022.01)

(56) References Cited

U.S. PATENT DOCUMENTS

2014/0295832 A1\* 10/2014 Ryu .................. H04W 48/16
                                                    455/434
2015/0327240 A1    11/2015 Yamada et al.
2017/0188391 A1\*  6/2017 Rajagopal ......... H04W 74/0816

OTHER PUBLICATIONS

Written Opinion of the ISA from PCT/KR2018/003542, dated Jul. 12, 2018.
Catt, et al.: "On Inter-carrier Configuration", R2-1701240, 3GPP TSG RAN WG2 Meeting #97, Athens, Greece, Feb. 13-17, 2017.
3GPP TS 36.885 V14.0.0, "TSGRAN; Study on LTE-based V2X Services (Release 14)", Jul. 20, 2016, pp. 9-10 (Section 4.1.2).

\* cited by examiner (a)

(b)

(a)

(b)

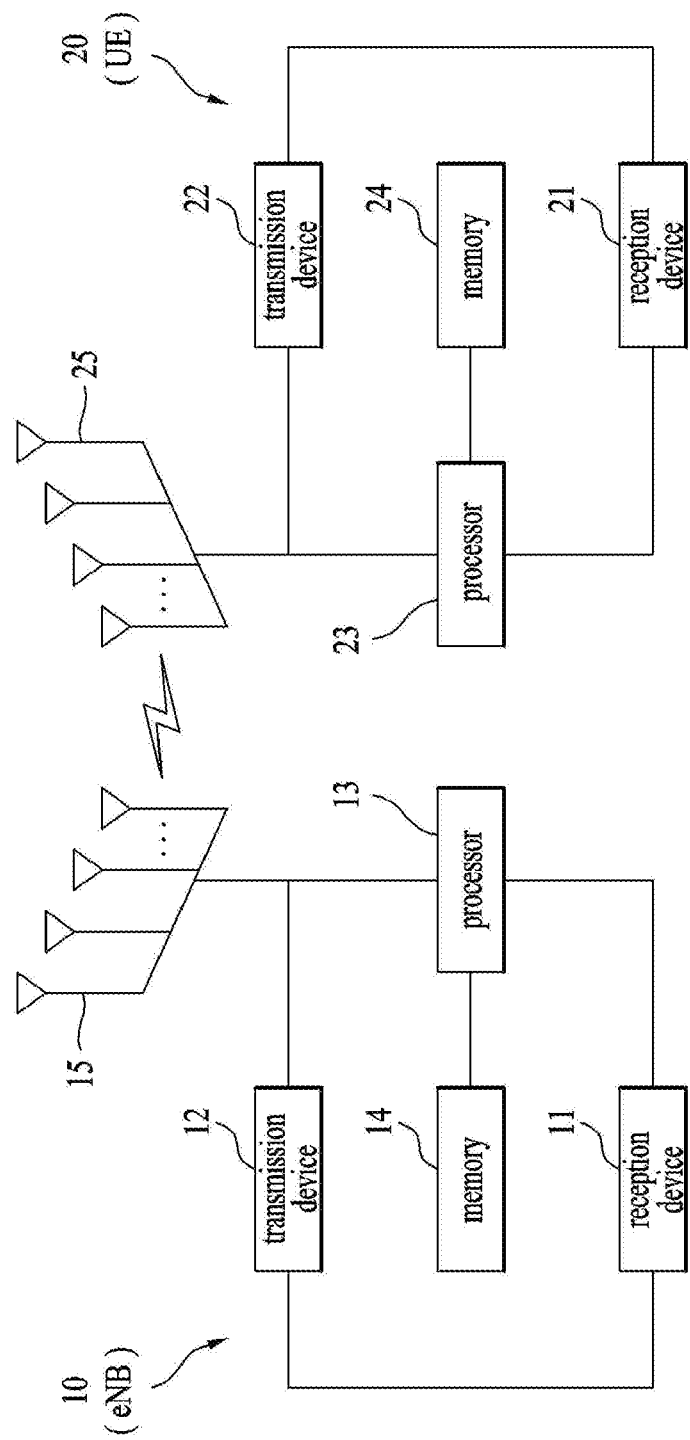

METHOD AND APPARATUS FOR TRANSMITTING SIDELINK SIGNAL IN WIRELESS COMMUNICATION SYSTEM

This application is a National Phase of PCT International Application No. PCT/KR2018/003542, filed on 26 Mar. 2018, which claims priority under 35 U.S.C. 119(e) to U.S. Provisional Application No. 62/475,868 filed on 24 Mar. 2017, No. 62/475,869 filed on 24 Mar. 2017 and No. 62/630,299 filed on 14 Feb. 2018 which is hereby incorporated by reference herein in their entirety.

TECHNICAL FIELD

The following description relates to a wireless communication system, and more particularly, to a method and apparatus for a user equipment to transmit a sidelink signal. Here, the wireless communication system a carrier aggregation (CA)-based wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE INVENTION

Technical Problems

The present disclosure provides a method of efficiently transmitting a sidelink signal when a plurality of carriers is configured and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

According to an aspect of the present disclosure, provided herein is a method of transmitting a sidelink (SL) signal by a user equipment (UE) in a wireless communication system, including configuring a plurality of carriers to which SL communication is applied, wherein an SL resource pool is periodically configured in each carrier; selecting one of the plural carriers as a serving carrier; selecting a transmission resource from the SL resource pool in the selected carrier; and transmitting the SL signal using the transmission resource, wherein a procedure of reselecting the serving carrier is lower in frequency than a procedure of reselecting the transmission resource from the SL resource pool in the selected carrier.

In another aspect of the present disclosure, provided herein is a user equipment (UE) for transmitting a sidelink (SL) signal in a wireless communication system, including a transmitter and a receiver; and a processor, wherein the processor is configured to configure a plurality of carriers to which SL communication is applied, wherein an SL resource pool is periodically configured in each carrier, select one of the plural carriers as a serving carrier, select a transmission resource from the SL resource pool in the selected carrier, and transmit the SL signal using the transmission resource, and wherein a procedure of reselecting the serving carrier is lower in frequency than a procedure of reselecting the transmission resource from the SL resource pool in the selected carrier.

Reselection of the transmission resource may be repeatedly performed according to a first condition and reselection of the serving carrier may be performed when a second condition is satisfied at a timing at which reselection of the transmission resource is scheduled.

The procedure of reselecting the transmission resource from the SL resource pool in the selected carrier may be performed during every transmission or performed when semi-persistent transmission is newly initiated.

A frequency of the procedure of reselecting the serving carrier is X times the procedure of reselecting the transmission resource from the SL resource pool in the selected carrier and X may be an integer equal to or greater than 2.

The procedure of reselecting the transmission resource from the SL resource pool in the selected carrier may be performed during every transmission with respect to all packets and the procedure of reselecting the serving carrier may be performed only during transmission of predefined partial packets.

The predefined partial packets may include at least one of a packet having a priority equal to or greater than a predetermined threshold value, a packet having a latency requirement less than a predetermined threshold value, or a single medium access control (MAC) packet data unit (PDU).

Advantageous Effects

According to the present disclosure, a sidelink signal may be efficiently transmitted when a plurality of carriers is configured.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 14 is a diagram showing configuration of a transceiver device.

BEST MODE FOR CARRYING OUT THE INVENTION

Figure 1:
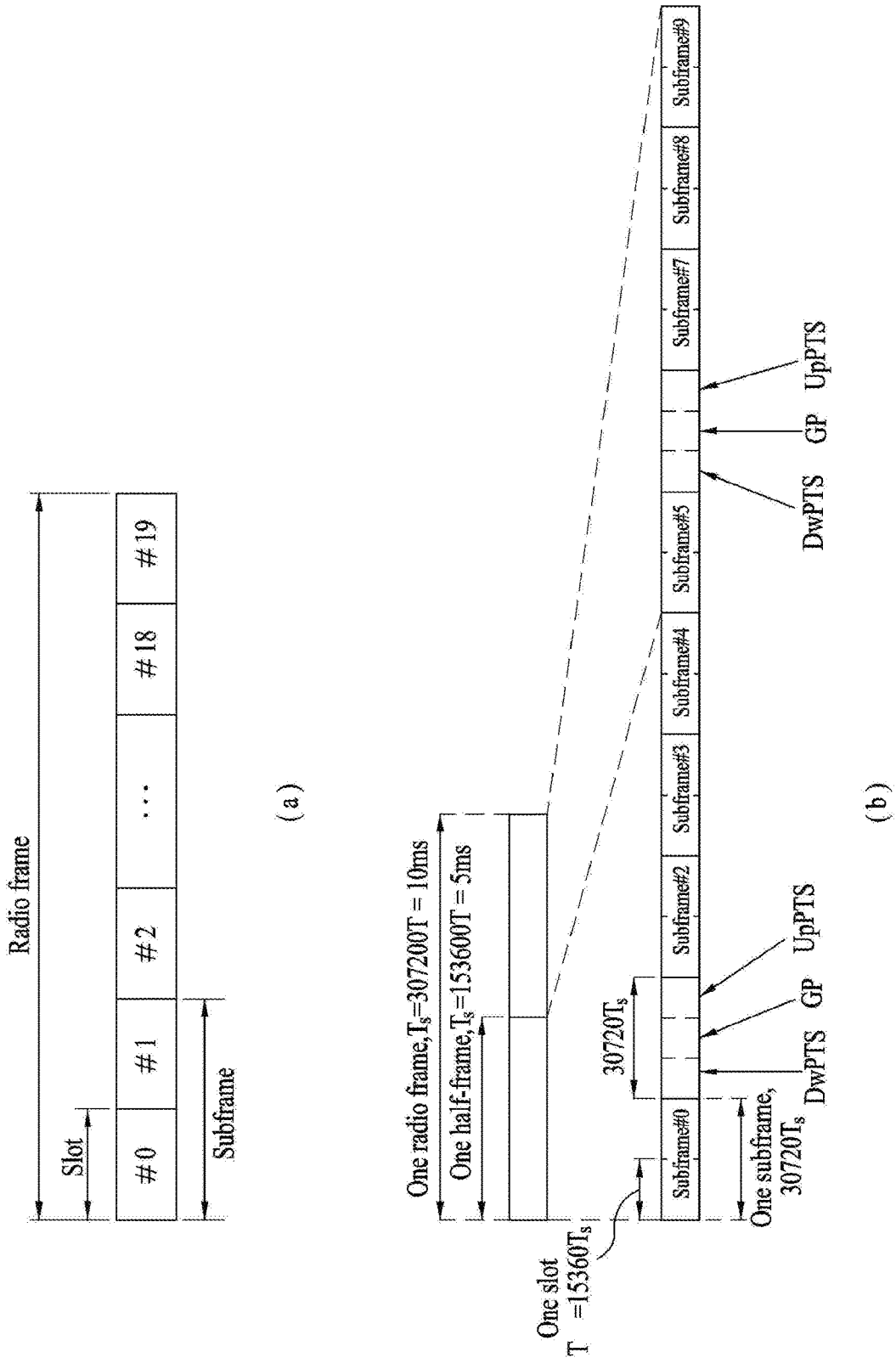
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-1-DMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
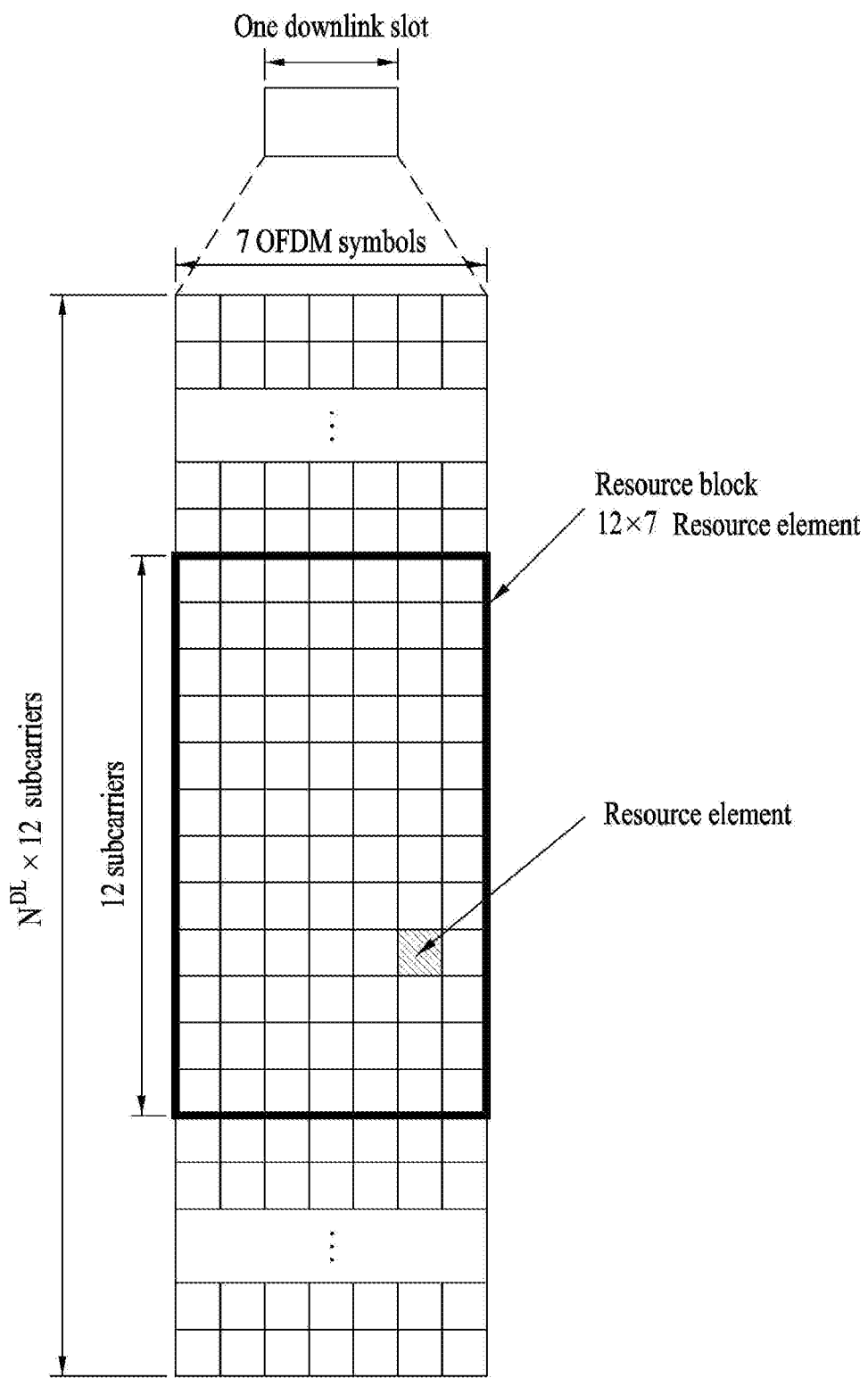
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
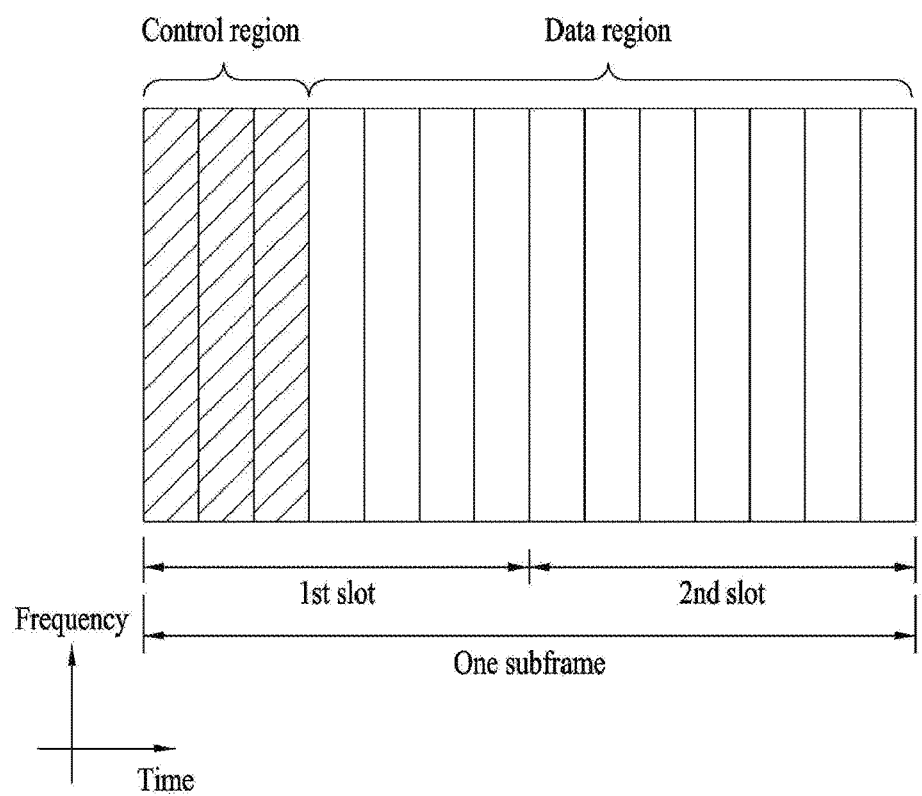
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
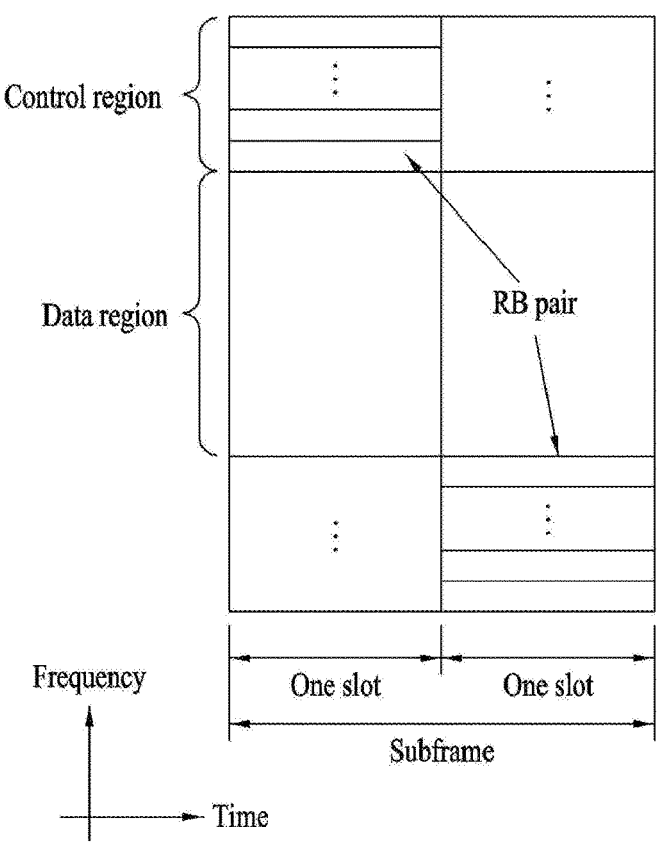
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
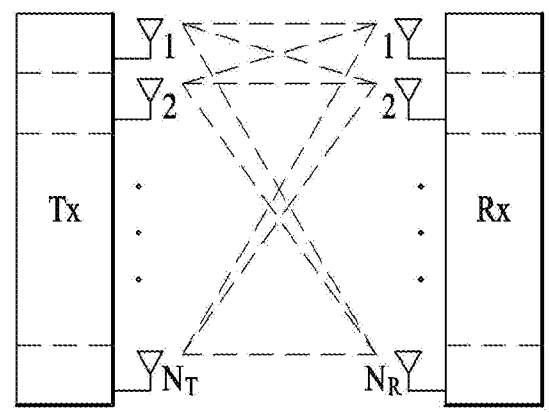
FIG. 5 is a view illustrating the configuration of a wireless communication system having multiple antennas.
Figure 5:
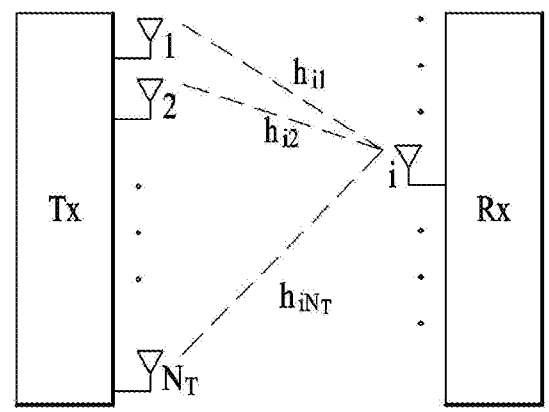

FIG. 5 is a diagram illustrating a configuration of a wireless communication system having multiple antennas.

As shown in FIG. 5(*a*), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
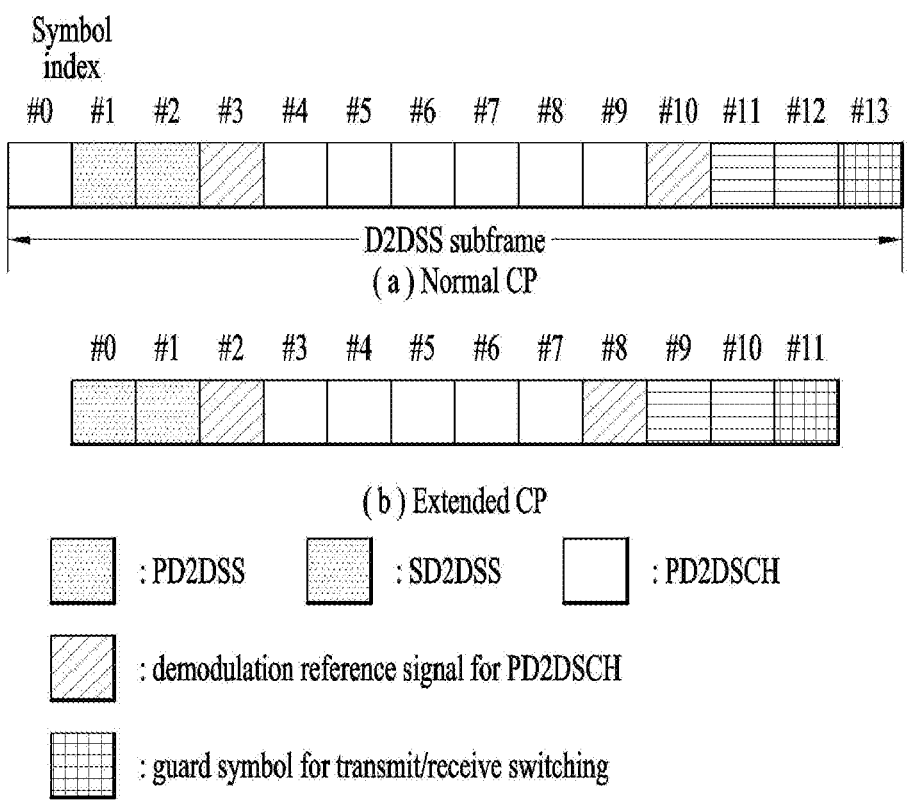
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
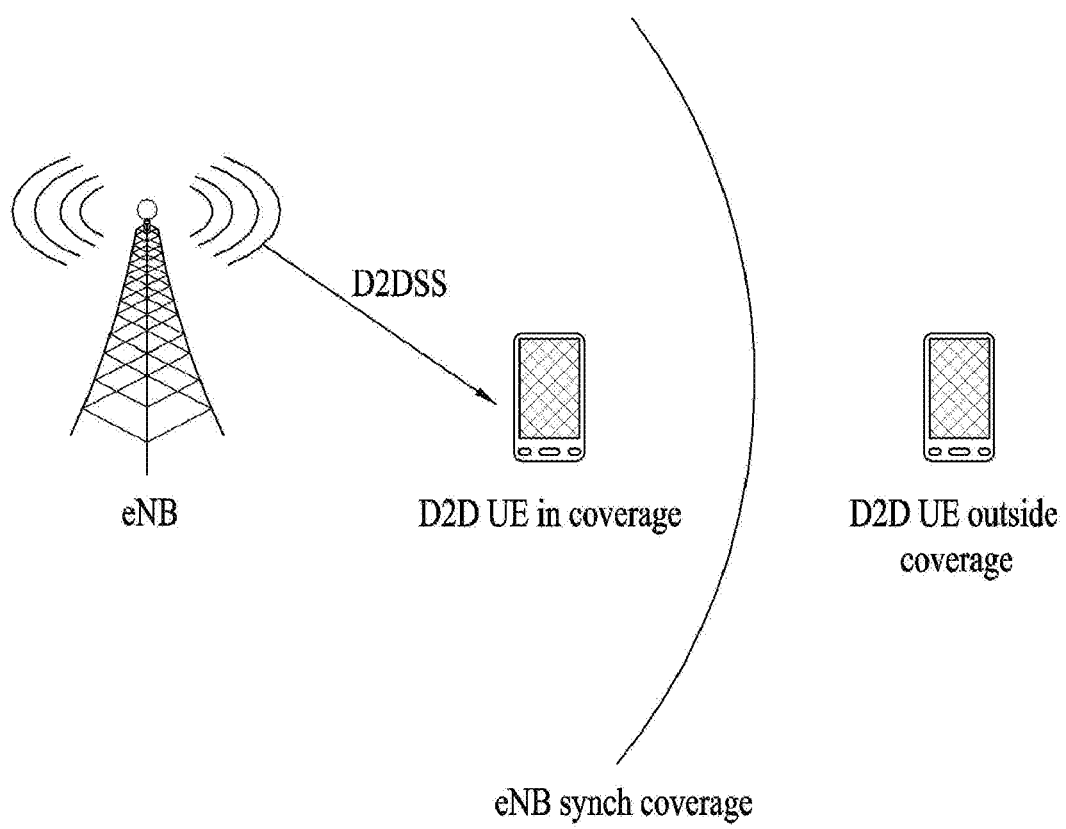
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
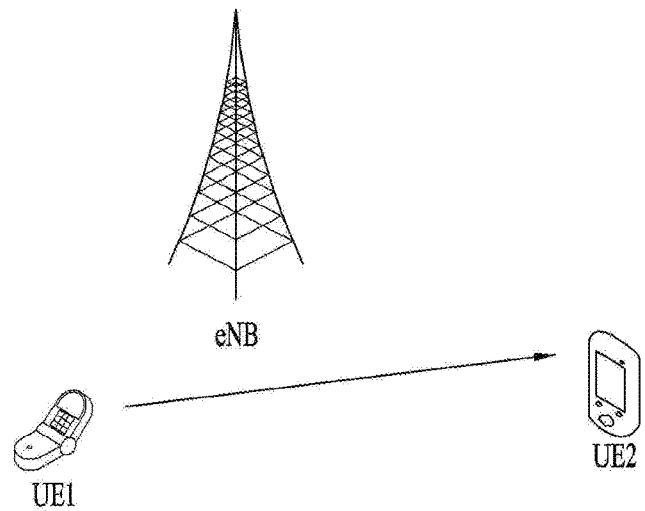
FIG. 8 is a view illustrating an exemplary D2D resource pool for D2D communication.
Figure 8:
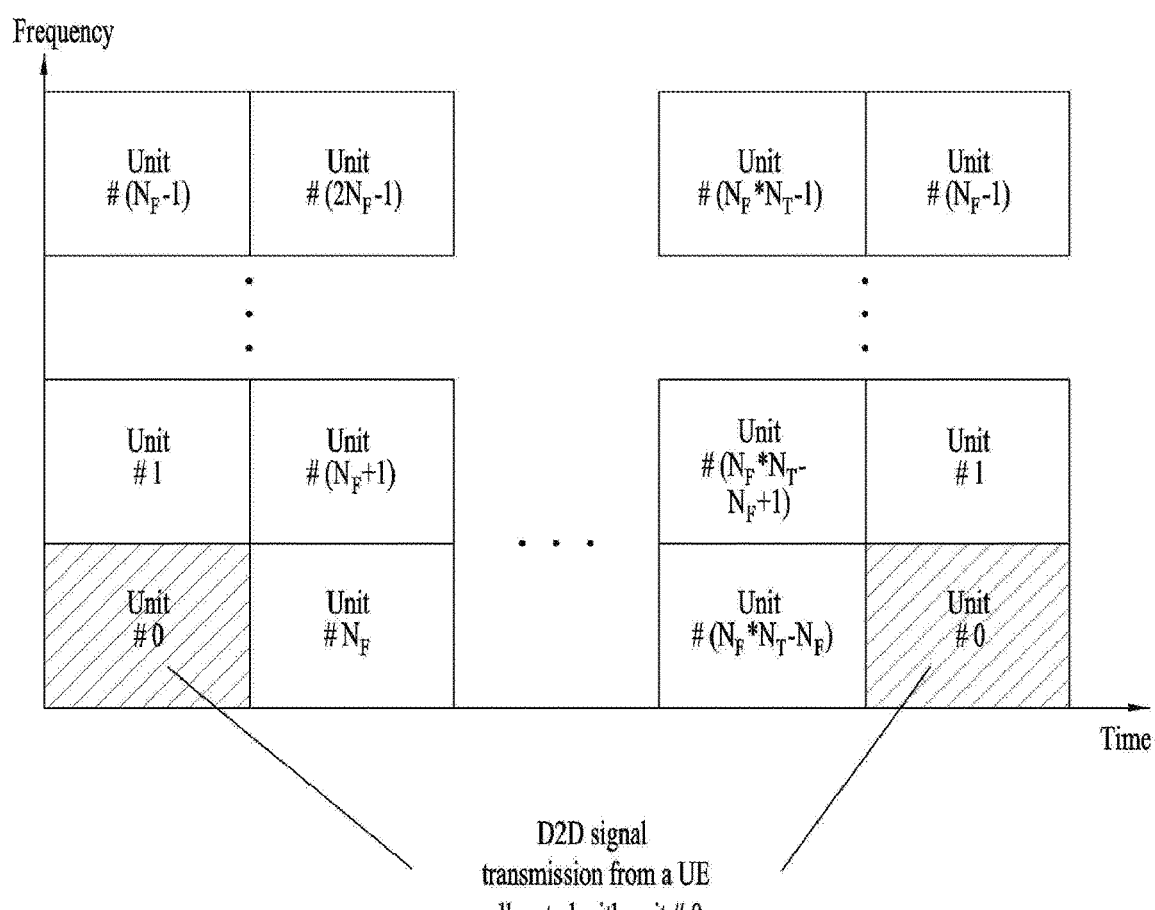

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
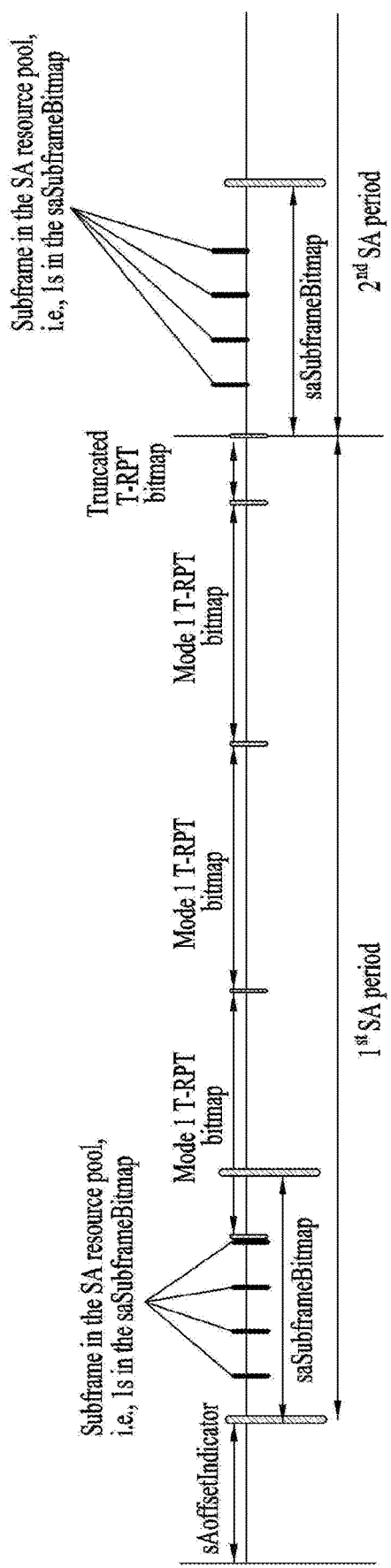
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In some implementations, in Vehicle-to-Vehicle (V2V) communication, a Cooperative Awareness Message (CAM) of a periodic message type, a Decentralized Environmental Notification Message (DENM) of an event triggered type and the like can be sent. Dynamic state information (e.g., a direction and a velocity) of a vehicle, a vehicle static data such as a size, basic vehicle information such as an external illumination state, a route history and the like can be contained in the CAM. A size of the CAM may range 50 to 300 bytes. The CAM is broadcasted and a latency should be smaller than 100 ms. The DENM may include a message created in case of an unexpected situation such as a vehicle breakdown, an accident or the like. A size of the DENM may be smaller than 3,000 bytes, and all vehicles within a transmission range can receive the corresponding message. In this case, the DENM may have a priority higher than that of the CAM. Here, having the higher priority may mean that when simultaneous transmissions occur in aspect of a single UE, a transmission having a higher priority is preferentially sent. Or, it may mean that it is intended to preferentially send a message having a high priority among several messages. In aspect of several UEs, a message of a high priority is rendered to receive interference smaller than that of a message of a low priority, whereby a reception error probability is lowered. In case that a security overhead is included, the CAM may have a message size larger than that of a case that the security overhead is not included. Regarding an embodiment of the present invention, 3GPP RAN1 #87 agreement is the related art of the present invention and can be used in a manner of being combined with the configuration of the present invention. Table 1 describes 3GPP RAN1 #87 agreement in part.

In the present specification, D2D may be call sidelink. In this case, SA may be referred to as a physical sidelink control channel (PSCCH) and a D2D synchronization signal may be referred to as a sidelink synchronization signal (SSS). In addition, a control channel which is transmitted together with the SSS and carries most fundamental prior to D2D communication may be referred to as a physical sidelink broadcast channel (PSBCH). A signal for indicating that a specific UE is present in the vicinity of a UE may include an ID of the specific UE and a channel over which such a signal is transmitted may be referred to as a physical sidelink discovery channel (PSDCH).

In D2D communication of 3GPP Release 12, only a D2D communication UE transmits the PSBCH together with the SSS and measurement of the SSS is performed using a DMRS of the DMRS. An out-coverage UE may measure the DMRS of the PSBCH and measures RSRP of the DMRS, thereby determining whether the UE will be a synchronization source.

NR [New RAT (Radio Access Technology)]

As more and more communication devices require greater communication capacity, there is a need for mobile broadband communication enhanced over existing radio access technology. In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, introduction of a new radio access technology considering enhanced mobile broadband communication, massive MTC, and Ultra-Reliable and Low Latency Communication (URLLC) is being discussed. In the present invention, for simplicity, this technology will be referred to as NR.

Figure 10:
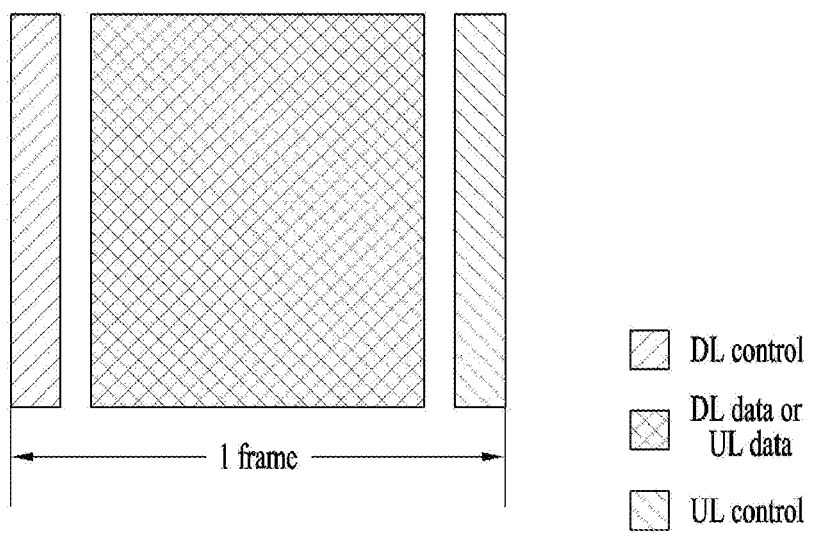
FIGS. 10 and 11 are views illustrating exemplary frame structures.
Figure 11:
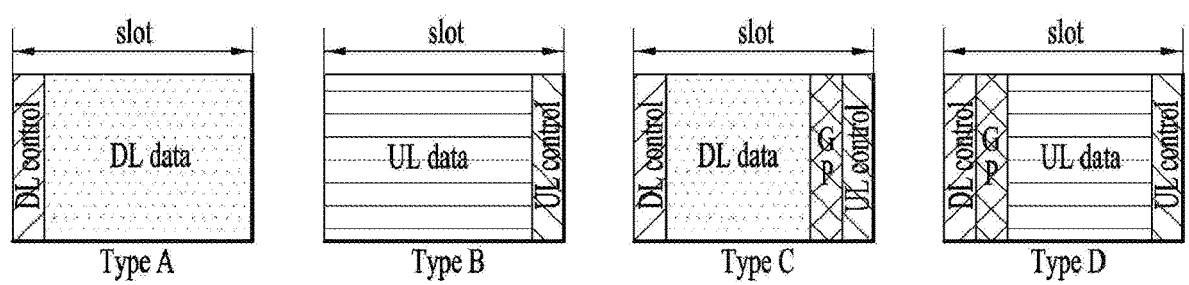

FIG. 10 shows an example of a frame structure usable for NR. Referring to FIG. 10, the frame structure of NR features a self-contained structure that can include a DL control channel, DL or UL data, and a UL control channel in one frame unit all together as shown in FIGS. 2-3. Here, DL data scheduling information and UL data scheduling information can be transmitted on the DL control channel, while ACK/NACK information for DL data, CSI information (modulation and coding scheme information, MIMO transmission related information, etc.), a scheduling request and the like can be transmitted on the UL control channel. A time gap for DL-to-UL or UL-to-DL switching may be present between the control region and the data region. In addition, some of DL control/DL data/UL data/UL control may not be configured in one frame. Or, the order of the channels constituting one frame may be changed (e.g., DL control/DL data/UL control/UL data or UL control/UL data/DL control/DL data).

CA(Carrier Aggregation)

Figure 12:
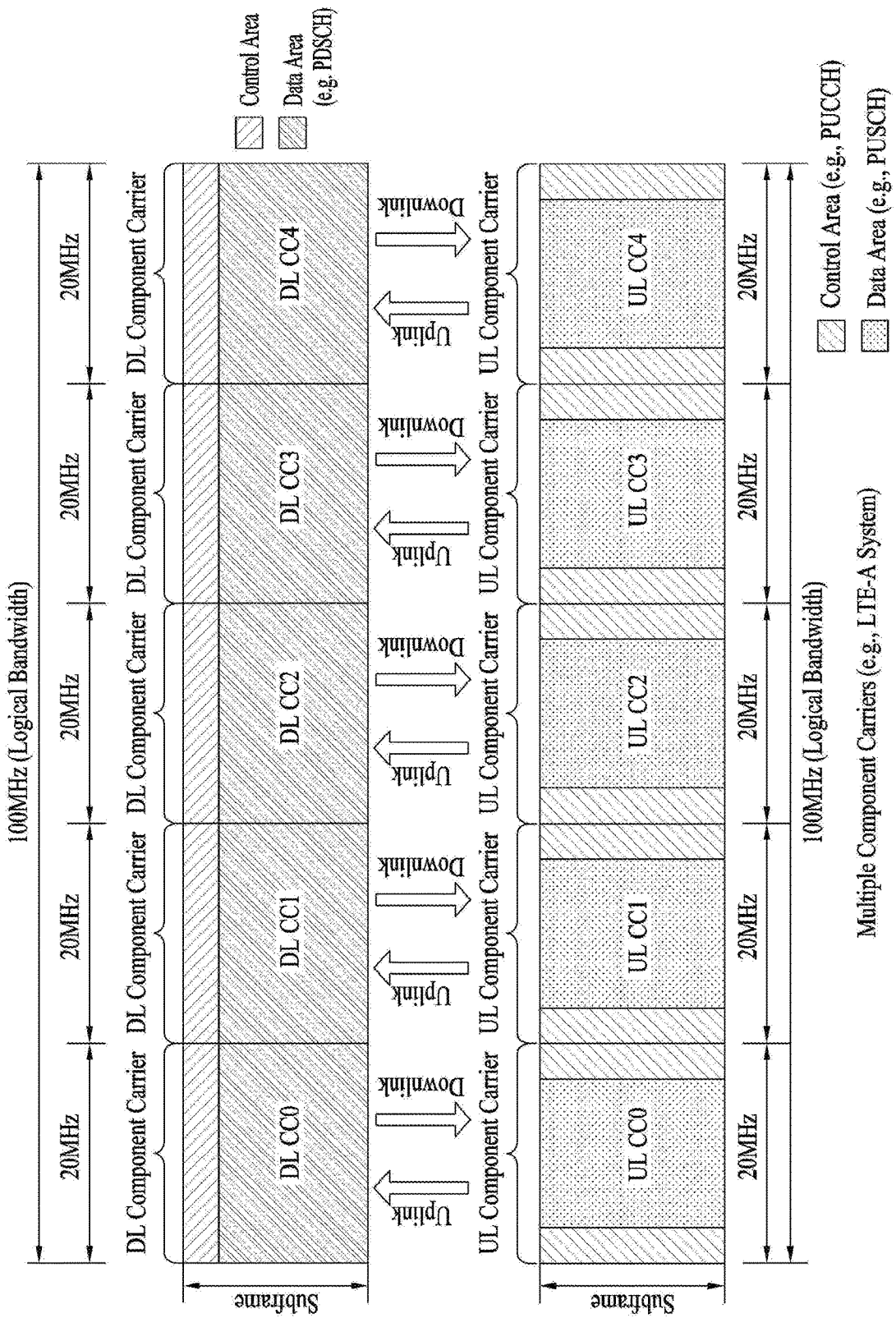
FIG. 12 illustrates a carrier aggregation (CA) communication system.

FIG. 12 illustrates a carrier aggregation (CA) communication system. Referring to FIG. 12, a plurality of UL/DL component carriers (CCs) may be collected to support a wider UL/DL bandwidth. Respective CCs may be continuous or discontinuous in a frequency region. Bandwidth of each CC may be independently determined. Asymmetric CA in which the number of UL CCs is different from the number of DL CCs may be performed. Control information may be configured to be transmitted or received only on a specific CC. Such a specific CC may be referred to as a primary CC and the other CCs may be referred to as secondary CCs. For example, when cross-carrier scheduling (or cross-CC scheduling) is applied, a PDCCH for DL allocation may be transmitted on DL CC#0 and a PDSCH corresponding to the PDCCH may be transmitted on DL CC#2.

Embodiment 1: Sidelink Carrier Selection and Resource Allocation

As described with reference to FIG. 8, for sidelink communication (i.e., UE-to-UE direct communication), a network (i.e., eNB) configures a time/frequency resource region usable for sidelink communication by a UE. The time/frequency region usable for sidelink communication is referred to as a resource pool (or, simply pool). In regard to the resource pool, the UE could conventionally transmit and receive a sidelink signal only in a resource pool on a single component carrier (CC). In LTE V2X (sidelink modes 3 and 4) of 3GPP Release 14, a zone-based resource pool is supported. In the zone-based resource pool, multiple resource regions are configured and a resource region usable by each UE is limited according to the location of the UE. Such a zone-based resource region selection scheme is referred to as zone-based resource pool selection or a zoning scheme.

In later communication technology, performing sidelink communication on a plurality of CCs configured as illustrated in FIG. 12 is considered. To perform sidelink communication on the plural CCs, the UE may select a specific resource pool of a specific CC and select a resource for transmission of a sidelink signal (e.g. medium access control (MAC) protocol data unit (PDU)) in the corresponding resource pool. In regard to this purpose, the resource region of FIG. 8 may be equally configured on all CCs, may be equally configured on a CC group basis, or may be independently configured per CC. Herein, "equally configured" may imply that a time/frequency region of the resource region is configured with the same size, at the same RB location, or at the same timing (e.g., subframe/slot location). To this end, information indicating the resource region may be commonly applied to multiple CCs. If the resource region is equally configured on each CC, signaling overhead may be reduced because a sidelink resource is equally configured on multiple CCs when a CA operation is performed. However, if the resource region is independently configured per CC, it may be impossible or inefficient to physically configure the same resource region as in the case in which bandwidth size per CC differs. Therefore, the resource region may be commonly configured per CC for extensibility of resource region allocation. Equally configuring the resource region per CC may be limitedly permitted to the case in which bandwidths of CCs are equal, CCs belong to the same band, or CCs are formed as a group by indication of a network but is not limited thereto. When sidelink communication is permitted on multiple CCs, the UE needs to determine which CC should be used for signal transmission/reception. In this case, if a CC is selected/changed, this may be understood as selection/change of a resource pool since this means that a resource region is selected/changed for sidelink signal transmission. That is, if a CC is (re) selected, this may be understood as (1) (re)selection of a CC or (2) (re)selection of a resource pool on a corresponding CC. Therefore, (re)selection of a CC in the present disclosure may be extended to (re)selection of a resource pool. From this point of view, CC (re)selection in the present specification may be used interchangeably with CC/pool (re)selection or pool (re)selection.

If semi-persistent transmission is configured in a resource pool, the UE may select a specific resource from the resource pool and then transmit a signal using the same frequency resource at every predetermined time (i.e., transmission cycle) (e.g., Unit #0 of FIG. 8). The transmission cycle may be a multiple of $N_T$ (refer to FIG. 8) or may be indicated by a network or predetermined. If semi-persistent transmission is newly initiated/configured, the UE may select a transmission resource through sensing from the resource pool or may randomly select the transmission resource. That is, whenever semi-persistent transmission is newly initiated/configured, the UE may perform resource (re)selection. Herein, sensing is a procedure of recognizing resources used by other UEs by measuring received signal received power (RSRP) or received signal strength indication (RSSI) on each time and frequency resource and may conform to a procedure of technical specification (TS) 36.213 of 3GPP Release 14. If semi-persistent transmission is not configured, the UE may randomly select the transmission resource from the resource pool. That is, the UE may perform resource (re)selection during every transmission. Which resource selection scheme will be used may be indicated by the network or predetermined. Herein, RSRP may include PSSCH-RSRP and RSSI may include sidelink RSSI (S-RSSI). PSSCH-RSRP indicates a linear average of power contributions W of all resource elements (REs) that carry a DMRS associated with a PSSCH within physical resource block(s) (PRB(s)) indicated by a PSSCH. S-RSSI indicates a linear average of total received power W per SC-FDMA symbol observed by the UE in a subchannel configured in SC-FDMA symbols #1 to #6 of the first slot of a subframe and in SC-1-DMA symbols #0 to #5 of the second slot of the subframe.

The UE may measure a channel busy ratio (CBR) in a specific resource pool. The CBR indicates a ratio of subchannels used by other UEs to all subchannels of the specific resource pool during a predetermined time. Herein, a subchannel is defined as a predetermined number of resource block (RB) groups and the subchannels used by other UEs indicate subchannels observed as having RSSI equal to or greater than a predetermined threshold value.

Upon performing CC/pool (re)selection in a system supporting a plurality of CCs/pools, the UE may perform CC/pool (re)selection based on load of each CC (e.g., S-RSSI or CBR) in order to control load per CC. For example, the UE may measure CBR from a plurality of CCs/pools and select a CC/pool having low CBR first. In this case, when to (re)select the CC/pool needs to be determined. Hereinafter, a method of (re)selecting the CC/pool will be proposed.

Hereinafter, (re)selection of a CC or a resource pool includes an operation of selecting/updating a CC/pool based on a specific metric (e.g., CBR). Even if a currently used CC or pool is selected by evaluating the specific metric, since a procedure of evaluating the metric for CC/pool (re)selection has been performed, CC/pool (re)selection may be regarded as being performed. That is, how frequently a CC/pool (re)selection operation is performed is an issue (i.e., a degree/frequency of occurrence) and an actual CC/pool may not be changed as a result of performing CC/pool (re) selection.

Alt. 1) The UE may (re)select a (load-based) CC/pool only when resource (re)selection is performed. As an example, when a reselection counter (Cresel) exceeds a predetermined value (e.g., 1) (e.g., while resource reservation is performed), the UE may not perform CC/pool (re) selection. In other words, CC (re)selection may not be performed until at least resource (re)selection is triggered. Herein, resource (re)selection may be performed during every transmission or performed when semi-persistent transmission is newly initiated/configured. This method may be limited to the case in which semi-persistent transmission is configured (i.e. resource (re)selection is performed when semi-persistent transmission is newly initiated/configured) but is not always limited thereto. For example, in TS36.213 and TS36.321 of 3GPP Rel. 14, the UE determines whether to perform resource reselection based on a probability that Cresel will be 0. The UE may randomly choose a number between 0 and 1 and determine whether to perform resource reselection according to a preset threshold. In this case, if it is declared that resource reselection should be performed, the UE may consider CC/pool reselection as well. In this case, both a method of always performing CC/pool reselection when Cresel is 0 regardless of whether probability-based resource reselection is performed and a method of performing CC/pool reselection only when resource reselection is determined by the probability-based resource reselection scheme may be considered. The former may be interpreted as the case in which CC/pool reselection is performed only when resource selection is certainly generated and the latter may be interpreted as the case in which CC/pool reselection is performed whenever there is a possibility that resource reselection will be generated.

In this method, the UE does not immediately change a CC/pool that the UE has reserved once according to load until resource (re)selection is performed. The UE maintains a once selected CC/pool for a predetermined time and does not perform too frequent CC/pool (re)selection so that other UEs may stably measure a congestion level. In addition, when the UE shares a resource region with legacy UEs (e.g., UEs in 3GPP Rel. 14), the UE may cause the legacy UEs not to perform additional resource reselection so that the legacy UEs may stably perform a sensing operation.

Alt. 2) The UE may perform CC/pool (re)selection whenever the UE transmits a packet (e.g., MAC PDU). This method may cause too much CC/pool switching. Therefore, CC/pool (re)selection may be limitedly performed for packet transmission (e.g., emergency packet) in which a (transmission) priority (e.g., when a ProSe per packet priority (PPPP) is a predetermined order or more or a predetermined order or less) is a predetermined threshold value or more, packet transmission (e.g., URLLC packet) in which a latency requirement is a predetermined threshold value or less, or single MAC PDU transmission (without resource reservation). Therefore, in the other cases, the UE may not perform CC/pool (re)selection even upon transmitting a packet. That is, the UE may selectively perform CC/pool (re)selection according to a condition (e.g., a packet type/status) during packet transmission.

For example, in the case of the emergency packet, the UE is permitted to use optimal CC/pool whenever the packet is transmitted so that a specific message may be transmitted well. However, in the case of a non-emergency packet, the UE is caused to use a legacy CC/pool when the packet is transmitted so that other UEs may stably measure the congestion level.

Alt. 3a) Separately from resource (re)selection, a CC/pool (re)selection counter (hereinafter, CC (re)selection timer) may be configured for the UE. Herein, the CC (re)selection counter may be determined in association with a counter for resource reservation (hereinafter, a reservation counter which may mean Cresel in TS36.213 of 3GPP release 14) or may be individually determined. For example, the CC (re)selection counter may be increased (or decreased) by 1 whenever a packet is transmitted or (during semi-persistent transmission) a resource reservation process (e.g., sidelink process) is ended (e.g., whenever the reservation counter expires or resource (re)selection occurs). In this case, the UE may perform CC/pool (re)selection according to a counter threshold value which is predetermined or is configured by a network or according to load observed per CC/pool for a related time when the CC (re)selection counter reaches a threshold value. The CC (re)selection counter may be determined in association with the resource (re)selection counter (e.g., Alt. 1, Cresel). For example, the UE may select X times a resource (re)selection counter value as a CC (re) selection counter value and perform pool/CC (re)selection when the CC (re)selection counter value is less than a predetermined value. Herein, X is a positive integer, desirably an integer equal to or greater than 2, and may be predetermined or may be indicated by the network. In addition, an (expiry) value of the counter used for CC (re)selection may be predetermined or may be signaled by the network. For example, when the UE selects 10 as Cresel, the UE uses the same frequency resource 10 times at a predetermined cycle. If X=3, the CC/pool reselection counter is determined as three times Cresel, i.e., 30, so that the UE may not perform CC/pool reselection in a resource reuse duration of 30 times. According to this method, the UE may selectively perform CC/pool (re)selection according to a condition during resource (re)selection (e.g., according to whether the CC (re)selection counter expires).

Alt. 3a may be configured such that CC/pool (re)selection may not be performed for a longer time as compared with Alt. 1 and, therefore, more stable load control may be performed relative to Alt. 1. However, speed at which load balancing is performed is slower as compared with Alt. 1.

Alt. 3b) The timer for CC/pool (re)selection (hereinafter, CC (re)selection timer) may be configured for the UE. During CC (or pool) selection, the UE operates the CC (re)selection timer and may not perform CC (or pool) (re)selection until the timer expires. In this case, when a legacy resource reservation process (e.g., sidelink process) or semi-persistent transmission is operating (i.e., before a resource reuse counter counted when a once reserved resource is used again expires), CC/pool (re)selection may not be performed as an exceptional case until the resource reservation process (e.g., sidelink process) is ended, even though the CC (re)selection counter expires. An expiry value or a threshold value of the timer used by the UE for CC/pool (re)selection may be predetermined or may be indicated by the network (e.g., eNB). If the threshold value of the timer is designated, the UE may set an arbitrary timer value within the timer threshold value.

Figure 13:
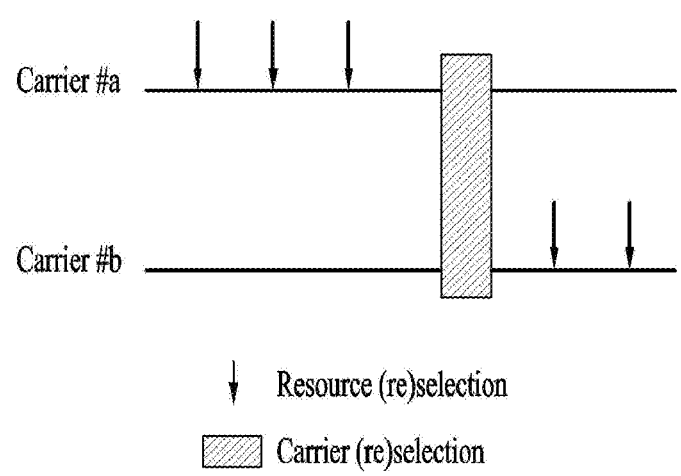
FIG. 13 is a diagram for explaining an embodiment of the present disclosure.

FIG. 13 illustrates a signal transmission procedure according to the present disclosure. For convenience, it is assumed that two carriers (carriers #a and #b) are configured for sidelink transmission. In this case, a resource pool for sidelink may be configured on each carrier (e.g., refer to FIG. 8). Herein, the resource pool may be periodically configured on a carrier. Referring to FIG. 13, the UE may select carrier #a as a serving carrier. Herein, the serving carrier means a carrier configured to perform transmission/reception of a sidelink signal thereon. The UE may select a transmission resource (e.g., subchannel) in a resource pool within the selected carrier (i.e., carrier #a) and transmit the sidelink signal using the selected transmission resource. Herein, resource (re)selection may be (repeatedly/periodically) triggered based on a first condition/event. For example, resource (re)selection may be performed during every transmission (when semi-persistent transmission is not configured) or may be performed when semi-persistent transmission is newly initiated/configured (when semi-persistent transmission is configured). Meanwhile, the UE may reselect a carrier based on load of a carrier (e.g., S-RSSI or CBR). In this case, carrier reselection may be triggered by a second condition/event. Then, the UE does not change a previously selected carrier until the second condition/event is generated. The second condition/event may be intermittently satisfied/generated as compared with the first condition/event. For a timing when carrier reselection is performed, reference may be made to Alt. 1 to Alt 3. If carrier #b is selected through carrier reselection, the UE may select a transmission resource (e.g., subchannel) in a resource pool within carrier #b and transmit a sidelink signal using the selected transmission resource.

Alt. 4) The UE may perform pool or CC (re)selection according to explicit indication of the network (e.g., eNB). The network may command the UE or plural UEs to perform CC (re)selection. In this case, the network may explicitly indicate to which CC/pool the UE or UEs should be moved. If the network determines that a specific pool or CC is excessively used for any reason, the network may command a specific UE or a specific UE group not to use the pool or CC. The network may signal a physical layer signal or a higher layer (e.g., radio resource control (RRC) signal to the UE as an indication signal for pool/CC reselection.

When Alt. 1 to Alt. 4 is applied, the zone-based CC/pool (re)selection method (i.e., zone-based pool selection) may be exceptionally performed. That is, the load-based CC/pool (re)selection may be performed by one of Alt. 1 to Alt. 4 or by a combination of various methods and zone-based pool (/CC) (re)selection of the UE may be separately performed regardless of load-based CC/pool (re)selection. As a pool is changed according to the location of the UE, resource (re)selection is naturally performed. However, if a CC is (re)selected whenever the pool is changed, CC (re)selection is too frequently performed. To prevent this case, change of the pool according to the location of the UE may not be regarded as resource (re)selection and, therefore, CC (re) selection is not performed during change of the pool according to the location of the UE.

Embodiment 2: Sidelink Resource Allocation in CA

A method of performing resource allocation when sidelink communication is applied to a plurality of CCs will now be described.

When the UE transmits and receives data on a plurality of CCs, if the UE independently selects a resource per CC, simultaneous transmission irregularly occurs between the CCs and then power spectrum density (PSD) per subframe may fluctuate. For example, the UE may perform transmission in subframes #n and #n+1 on CC A and perform transmission in subframes #n and #n+2 on CC B. In this case, the UE should allocate half of transmission power to each CC in subframe #n, whereas the UE may allocate all transmission power to a specific CC in subframes #n+1 and #n+2. Then, from the viewpoint of the UE, there may be a difference of 3 dB in reception power between subframe #n and subframes #n+1 and #n+2. In this case, since signal-to-noise ratio (SNR) per (re)transmission of a specific message fluctuates, link quality may become unstable.

Accordingly, a method of determining whether to select the same subframe as on a specific carrier or select other subframes in a resource selection process needs to be introduced.

Prior to a detailed description of the present disclosure, terminologies are defined as follows.

Simultaneous transmission between CCs: This means that the UE simultaneously transmits messages on multiple CCs. Herein, "simultaneous" implies that a unit in which one transmission occurs (e.g., a transmit time interval (TTI)) totally or partially overlaps.

Separate transmission between CCs: This means that the UE transmits data on only one CC in one TTI upon transmitting messages on multiple CCs.

According to the present disclosure, the UE may determine whether to permit simultaneous transmission between CCs, only simultaneous transmission, or only separate transmission, according to a message (data) type, an application type, or a priority level.

Specifically, only simultaneous transmission may be permitted for specific messages. For example, when the volume of data is large so that messages should be simultaneously transmitted within a predetermined time, the data may always be simultaneously transmitted using multiple CCs. To this end, a higher layer (e.g., RRC) may transmit an indicator indicating whether to perform simultaneous transmission to a physical layer. Upon receiving multiple transport blocks (TBs) from the higher layer, the UE may transmit the TBs always in the same subframe when an indicator indicating that simultaneous transmission should be performed is True.

When simultaneous transmission is performed on multiple carriers or data transmission is performed on multiple carriers, the UE should choose simultaneously available resources from among multiple CCs through a sensing operation. To this end, a method of performing operation by combining measurements such as PSSCH-RSRP and S-RSSI per may be considered instead of independently selecting a subchannel per CC by the UE. For example, the UE may compare a value of adding measurement results of S-RSSI per subchannel of CC X and CC Y in subframe #n with a value of adding measurement results of S-RSSI per subchannel of CC X and CC Y in subframe #n+1 and determine a subframe having a lower value as a transmission subframe or determine a final resource selection reference (e.g., which is randomly selected from among resources having a combined value less than (or equal to or less than) a predetermined threshold value) based on a combined value. Alternatively, the UE may report a sensing result value (e.g., PSSCH-RSRP and/or S-RSSI) per CC to the higher layer (e.g., RRC) and the higher layer may determine a transmission subframe by adding sensing results of respective CCs upon selecting a transmission resource.

More specifically, the UE may select subchannel(s) having the lowest S-RSSI or the lowest PSSCH-RSRP per CC, perform operation of sum of the lowest S-RSSI values for respective subframes, and randomly select a final subframe from among subframes having the sum of S-RSSI values less than a predetermined threshold value.

Meanwhile, if only simultaneous transmission is permitted, the UE may determine a resource on CC Y according to selection of a resource on CC X. As an example, if the UE selects transmission in subframe #n on CC X, the UE may perform transmission in subframe #n even on CC Y.

Description will now be given using 3GPP Rel-14 V2V resource allocation. If the UE selects subframe #n on CC X (step 1), the UE may exclude all subframes other than subframe n (step 2) and select resources only in subframe #n on CC Y (step 3). In this case, since resources may not be sufficiently secured in subframe #n, a condition in which resources are randomly selected from among resources having S-RSSI less than a threshold value in step 3 may be changed to determine a rule such that resources having S-RSSI of a minimum value may be selected. Alternatively, the case in which resources having S-RSSI less than a predetermined threshold value never reach 20% may occur. For example, when 4 subchannels are configured, even if only one subchannel is selected, since this indicates that resources of 25% are selected, resources less than 20% cannot be selected. In this case, a rule may be determined such that resources having S-RSSI of a minimum value are selected or a relative ratio of resources which should be minimally secured is adjusted as another value. For example, in this case, a condition in which resources are randomly selected from among resources of lower 20% may not be applied (i.e., a condition for percentage of resources which should be minimally secured is not applied).

As another method, only (partial) separate transmission between CCs may always be permitted with respect to a specific type of message, a specific PPPP, a specific service of message, or a specific application. If only separate transmission is permitted, this may correspond to the case in which a transmission UE includes only one transmission chain or the case in which the number of transmission chains is less than a predetermined number. In addition, if only separate transmission is permitted, this may correspond to the case in which separate services should be simultaneously supported, the case in which independent TBs are transmitted on separate CCs, or the case in which a specific message is transmitted. For example, when the UE performs transmission on only one CC (e.g., CC A) at one timing (e.g., subframe), the UE may select, on the other CCs, transmission resources from among subframes except for the subframe selected on CC A. This may be generalized such that, when resource (re)selection occurs, resources which have already been selected on other carriers in a selectable resource region are excluded.

For example, when subframe #n1 and subframe #n2 are used on CC A, subframe #n1 and subframe #n2 are excluded during resource (re)selection on CC B. In this case, if semi-persistent transmission is performed, n1+reservation period and n2+reservation period may also be excluded from transmission resources. Further, subframes corresponding to a multiple of the reservation period as well as the immediately next reservation period may be excluded from transmission subframes. Particularly, when reservation periods on respective CCs are different, subframes having a possibility of collision in consideration of future reservation on a specific CC and future reservation on a current CC may be excluded. In this case, exclusion of semi-persistent transmission resources may be determined in association with a reservation counter value. Since the transmission UE may be aware when data is transmitted on other CCs and which counter value is transmitted, expected corresponding resources may be previously excluded from transmission resources.

The contents of the present disclosure are not limited only to UE-to-UE direction communication and may also be used in UL and DL. In this case, an eNB or a relay node may use the above proposed methods.

Since examples of the above-described proposed methods may be included in one of implementation methods of the present disclosure, it is obvious that the examples are regarded as a sort of proposed methods. Although the above-described proposed methods may be independently implemented, the proposed methods may be implemented in a combined (aggregated) form of a part of the proposed methods. A rule may be defined such that the eNB informs the UE of information as to whether the proposed methods are applied (or information about rules of the proposed methods) through a predefined signal (e.g., a physical layer signal or a higher-layer signal).

Device Configuration According to Embodiment of Present Invention

FIG. 14 is a diagram showing the configuration of a transmitting point device and a user equipment device according to an embodiment of the present invention.

Referring to FIG. 14, a transmitting point device 10 according to the present invention may include a receiving device 11, a transmitting device 12, a processor 13, a memory 14 and a plurality of antennas 15. A plurality of the antennas 15 may mean a transmitting point device supportive of MIMO transmission and reception. The receiving device 11 can receive various signals, data and information in uplink from a user equipment. The transmitting device 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and be substituted with such a component as a buffer (not) and the like.

Referring still to FIG. 13, a user equipment device 20 according to the present invention may include a receiving device 21, a transmitting device 22, a processor 23, a memory 24 and a plurality of antennas 25. A plurality of the antennas 25 may mean a user equipment device supportive of MIMO transmission and reception. The receiving device 21 can receive various signals, data and information in downlink from a transmitting point. The transmitting device 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description. Particularly, the processor configures a plurality of CCs for which a sidelink communication is configured, performs CC/pool (re)selection in the plurality of CCs, and transmit signal by selecting a transmission resource from the selected CC/pool.

The processor 23 of the user equipment device 20 performs functions of operating and processing information received by the user equipment device 20, information to be transmitted by the user equipment device 20, and the like. The memory 24 can store the operated and processed information and the like for a prescribed period and be substituted with such a component as a buffer (not shown) and the like.

In the above-mentioned specific configurations of the transmitting point device and the user equipment device, the contents or items explained in the descriptions of the various embodiments of the present invention may be independently applicable or two or more embodiments of the present invention may be simultaneously applicable. And, redundant descriptions shall be omitted from the following description for clarity.

Moreover, the description of the transmitting point device 10 with reference to FIG. 13 may be identically applicable to a relay node device as a DL transmitting entity or a UL receiving entity. And, the description of the user equipment device 20 with reference to FIG. 15 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

The invention claimed is:

1. A method of transmitting a sidelink (SL) signal by a wireless device in a wireless communication system, the method comprising:
   performing a carrier selection procedure to select a first carrier from a plurality of carriers;
   selecting a first transmission resource from a resource pool in the first carrier,
   wherein the resource pool includes transmission resources and is repeated in a time domain;
   transmitting one or more sidelink (SL) packets using the first transmission resource repeated in a plurality of resource pools,
   wherein a carrier reselection counter and a resource reselection counter decrease by one per a transmission of each SL packet, and
   wherein the carrier selection procedure is performed based on a value of carrier reselection counter that is less than a threshold value, and
   performing a resource selection procedure based on the resource reselection counter in a carrier,
   wherein the carrier reselection counter is bigger than the resource reselection counter.

2. The method of claim 1, wherein a procedure of reselecting a transmission resource from the resource pool in the first carrier is performed every SL transmission or performed when semi-persistent SL transmission is newly initiated.

3. The method of claim 1, wherein a procedure of reselecting a transmission resource from the resource pool in the first carrier is performed every transmission with respect to all SL packets.

4. A wireless device for use in a wireless communication system, the wireless device comprising:
   a transmitter and a receiver; and
   a processor, operatively coupled to the transmitter and the receiver,
   wherein the processor is configured to
      perform a carrier selection procedure to select a first carrier from a plurality of carriers,
      select a first transmission resource from a resource pool in the first carrier,
      wherein the resource pool includes transmission resources and is repeated in a time domain,
      transmit one or more sidelink (SL) packets using the first transmission resource repeated in a plurality of resource pools,
      wherein a carrier reselection counter and a resource reselection counter decrease by one per a transmission of each SL packet, and
      wherein the carrier selection procedure is performed based on a value of reselection counter that is less than a threshold value, and
      perform a resource selection procedure based on the resource reselection counter in a carrier,
      wherein the carrier reselection counter is bigger than the resource reselection counter.

5. The wireless device of claim 4, wherein a procedure of reselecting a transmission resource from the resource pool in the first carrier is performed every SL transmission or performed when semi-persistent SL transmission is newly initiated.

6. The wireless device of claim 4, wherein a procedure of reselecting a transmission resource from the resource pool in the first carrier is performed every transmission with respect to all SL packets.

7. The wireless device of claim 4, wherein the wireless device is an autonomous vehicle that communicates with at least a mobile terminal, a network, and another autonomous vehicle other than the wireless device.

* * * * *